United States Patent
Park et al.

(10) Patent No.: US 8,121,054 B2
(45) Date of Patent: Feb. 21, 2012

(54) METHOD FOR GAP ANALYSIS FOR NETWORK TOPOLOGY INSPECTION IN ETHERNET-BASED NETWORK

(75) Inventors: Jun Hee Park, Daejeon (KR); Kyeong Deok Moon, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/423,872

(22) Filed: Apr. 15, 2009

(65) Prior Publication Data

US 2010/0074142 A1 Mar. 25, 2010

(30) Foreign Application Priority Data

Sep. 19, 2008 (KR) .................. 10-2008-0092082

(51) Int. Cl.
*H04L 12/28* (2006.01)
(52) U.S. Cl. .................................................. 370/255
(58) Field of Classification Search .................. None
See application file for complete search history.

(56) References Cited

U.S. PATENT DOCUMENTS

| | | | | |
|---|---|---|---|---|
| 5,491,690 A * | 2/1996 | Alfonsi et al. | ............... | 370/404 |
| 5,598,532 A * | 1/1997 | Liron | ............... | 703/2 |
| 5,831,975 A * | 11/1998 | Chen et al. | ............... | 370/256 |
| 5,850,397 A * | 12/1998 | Raab et al. | ............... | 370/392 |
| 6,011,780 A * | 1/2000 | Vaman et al. | ............... | 370/237 |
| 6,061,334 A * | 5/2000 | Berlovitch et al. | ............... | 370/255 |
| 6,097,696 A * | 8/2000 | Doverspike | ............... | 370/216 |
| 6,215,766 B1 * | 4/2001 | Ammar et al. | ............... | 370/229 |
| 6,377,987 B1 | 4/2002 | Kracht | | |
| 6,631,128 B1 * | 10/2003 | Lemieux | ............... | 370/351 |
| 6,842,780 B1 * | 1/2005 | Frei et al. | ............... | 709/221 |
| 6,914,886 B2 * | 7/2005 | Peles et al. | ............... | 370/254 |
| 7,069,343 B2 | 6/2006 | Goringe et al. | | |
| 7,466,663 B2 * | 12/2008 | Young et al. | ............... | 370/254 |
| 7,554,988 B2 * | 6/2009 | Zhang et al. | ............... | 370/395.31 |
| 7,724,655 B2 * | 5/2010 | Saleh et al. | ............... | 370/228 |
| 2002/0010735 A1 * | 1/2002 | McMillen et al. | ............... | 709/201 |
| 2002/0150111 A1 * | 10/2002 | Marce | ............... | 370/401 |
| 2005/0025071 A1 * | 2/2005 | Miyake et al. | ............... | 370/254 |
| 2005/0083859 A1 * | 4/2005 | Kang | ............... | 370/254 |
| 2005/0169179 A1 * | 8/2005 | Antal et al. | ............... | 370/231 |
| 2005/0169193 A1 * | 8/2005 | Black et al. | ............... | 370/254 |
| 2006/0198408 A1 | 9/2006 | Park et al. | | |
| 2008/0025208 A1 * | 1/2008 | Chan | ............... | 370/217 |
| 2008/0031156 A1 * | 2/2008 | Balasubramaniam et al. | ............... | 370/254 |
| 2008/0089243 A1 * | 4/2008 | Jameson et al. | ............... | 370/255 |
| 2008/0198753 A1 * | 8/2008 | Choudhury et al. | ............... | 370/242 |
| 2010/0039940 A1 * | 2/2010 | Wang et al. | ............... | 370/241 |
| 2010/0195531 A1 * | 8/2010 | Andreoletti et al. | ............... | 370/254 |

FOREIGN PATENT DOCUMENTS

| | | | |
|---|---|---|---|
| KR | 1020040034703 A | 4/2004 | |
| KR | 1020060068496 A | 6/2006 | |
| KR | 1020060093584 A | 8/2006 | |

* cited by examiner

*Primary Examiner* — Chirag Shah
*Assistant Examiner* — Joshua Smith
(74) *Attorney, Agent, or Firm* — Ladas & Parry LLP

(57) ABSTRACT

A method for gap analysis for topology inspection to recognize a topology of a deep segment through gap discovery in an Ethernet network, includes: a gap division process of dividing a gap into atomic gaps that are no longer divided through path crossing test (PCT); and a gap interpretation process of analyzing a final result of the PCT when the atomic gap is generated, to interpret a topology of the gap.

15 Claims, 7 Drawing Sheets

METHOD FOR GAP ANALYSIS FOR NETWORK TOPOLOGY INSPECTION IN ETHERNET-BASED NETWORK

CROSS-REFERENCE TO RELATED APPLICATIONS

The present invention claims priority of Korean Patent Application No. 10-2008-0092082, filed on Sep. 19, 2008, which is incorporated herein by reference.

FIELD OF THE INVENTION

The present invention relates to a method for gap analysis for network topology inspection in an Ethernet network, and more particularly, to a gap analysis method for creating topology information that is basic information for network management in an Ethernet network, which is built with a function of two or less layers among seven open system interconnection (OSI) layers having no particular manager, such as a home network, an office network, and the like.

BACKGROUND OF THE INVENTION

There is link layer topology discovery (LLTD) technology for network state recognition and failure solution in a home or office environment in which a plurality of personal computers are disposed. The link layer topology discovery technology has been developed and suggested by MicroSoft and distributed while being included in an operating system for a personal computer.

However, the link layer topology discovery technology failed to accurately recognize an actual network topology, as described in related documents.

Protocol for the link layer topology discovery provides almost perfect base technology on a procedure but does not suggest an accurate algorithm in a process of analyzing an ambiguous gap, resulting in inaccurate topology.

With the link layer topology discovery technology for network state recognition and failure solution in a home or office environment in which a plurality of personal computers are disposed, the network topology cannot be accurately recognized due to inaccurate gap analysis, as described above.

SUMMARY OF THE INVENTION

In view of the above, the present invention provides a method capable of finally analyzing network test results and discovering a connected network segment having no host, i.e., a deep segment in a form substantially similar to an actual network to accurately recognize a network topology in a network built with a layer 2 switch or hub.

In accordance with a first aspect of the present invention, there is provided a method for gap analysis for topology inspection to recognize a topology of a deep segment through gap discovery in an Ethernet network, the method including: a gap division process of dividing a gap into atomic gaps that are no longer divided through path crossing test (PCT); and a gap interpretation process of analyzing a final result of the PCT when the atomic gap is generated, to interpret a topology of the gap.

The gap division process may include: storing the discovered gaps in a gap queue; fetching the gaps from the gap queue one by one until the gap queue is empty and checking the number of island edge switches; when the number of the island edge switch is less than a set number, regarding the deep segments between the island edge switches as being connected via one Ethernet link; and when the number of the island edge switches is more than the set number, performing the PCT test on edge switches belonging to the fetched gaps until there is no edge switches that are not selected as a PCT divider, and storing the divided atomic gaps in an atomic gap queue.

Storing the atomic gaps in the atomic gap queue may include: determining whether there is an island edge switch that is not selected as a PCT divider among the island edge switches belonging to the gap; when there is an island edge switch that is not selected as a PCT divider, selecting the island edge switch that is not selected as a divider belonging to the gap and performing the PCT on the selected island edge switch; analyzing the PCT result to determine whether the gap is divided; determining again whether there is a switch is not selected as a PCT divider when the gap is not divided, and dividing the gap with respect to the divider edge switch and inserting the divided gaps into the gap queue when the gap is divided; and when there is no island edge switch that is not selected as a PCT divider, regarding a gap subjected to PCT as the atomic gap and storing the gap together with PCT result information in the atomic gap queue.

The gap interpretation process may include: fetching the atomic gaps from the atomic gap queue one by one until the atomic gap queue in which the atomic gaps are stored is empty, and analyzing the PCT result to formalize the topology; creating replacement rules to replace the PCT result and convert a topology expression; and removing a redundant expression of the topology expression and then removing a loop.

Further, the PCT test result may be divided into a plurality of switch group slots and one hub group slot, which are stored.

The final result of the PCT may be obtained using a rule that when there is an island ID belonging to two switch group slots created by the PCT test result, the two switch group slots are incorporated to create a new the switch group slot.

Further, the final result of the PCT may be obtained using a rule that when island IDs as elements of an island pair in the hub group slot are included in different switch group slots, the two switch group slots are incorporated into one.

Furthermore, the final result of the PCT may be obtained using a rule that after a final switch group slot is obtained, a union set of island IDs belonging to all island pairs remaining in the hub group slot is obtained to create an island list and a difference set with the final switch group slot is obtained.

When a hub of the rule is not a null set, a rule that the edge switch of the divider island is connected to a hub constituting the gap may be applied in analyzing the final result of the PCT.

Further, when a hub of the rule is a null set, a rule that the edge switch of the divider island is connected to a switch constituting the gap may be applied in analyzing the final result of the PCT.

A rule that there is at least one switch between each island edge switch in the switch group slot and a divider island edge switch may be applied in analyzing the final result of the PCT.

The replacement rule may be created by applying a rule that one of two continuous hubs having different IDs is replaced with the other.

Further, the replacement rule may be created by applying a rule that one of two continuous switches having different IDs is replaced with the other.

The replacement rule may be created by applying a derived rule "A is replaced with C" when there are replacement rules "A is replaced with B" and "B is replaced with C."

Furthermore, the replacement rule may be created by applying a derived rule "B is replaced with C" when there replacement rules "A is replaced with B" and "A is replaced with C."

According to the present invention, it is possible to accurately collect network topology information through accurate gap analysis in a network environment built with a layer 2 switch or hub, such as a home network, an office network, and the like.

It is also possible to collect traffic information or provide multimedia service sensitive to quality of service (QoS) based on an accurate topology in a small Ethernet network having no manager, and to easily and accurately perform network management by providing a more accurate diagnosis mechanism upon network failure.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
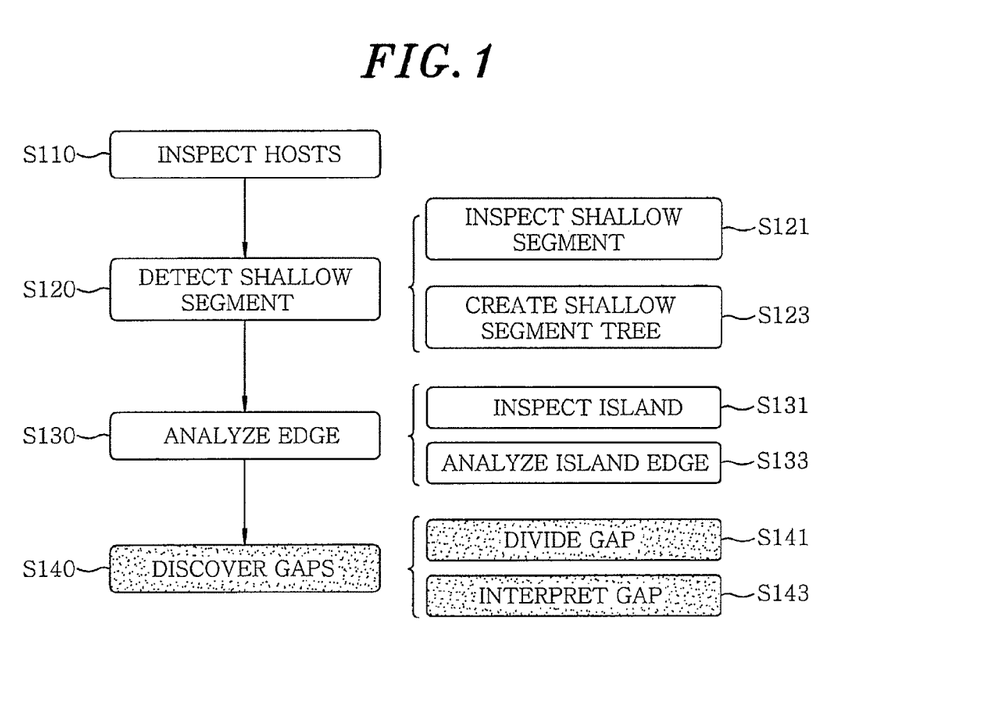
FIG. 1 is a flow chart illustrating a procedure for inspecting a topology using a method for gap analysis for topology inspection in an Ethernet network built with a layer 2 switch and hub according to the present invention

FIG. 1 is a flow chart illustrating a procedure for inspecting a topology using a method for gap analysis for topology inspection in an Ethernet network built with a layer 2 (L2) switch and hub according to the present invention.

Referring to FIG. 1, a procedure for inspecting a topology of an Ethernet network includes a first process S110 of inspecting hosts (network nodes) connected to an Ethernet, a second process S120 of discovering a shallow segment relationship by detecting a shallow segment for the inspected nodes and creating a shallow segment tree, a third process S130 of analyzing a connection relationship between shallow segments through edge analysis for the shallow segment tree to discover islands divided by deep segments, and a fourth process S140 of recognizing a topology of the deep segments by discovering gaps.

The second process S120 includes a process S121 of inspecting a shallow segment to which at least one host is connected, and a process S123 of creating a tree among the shallow segments.

Figure 2:
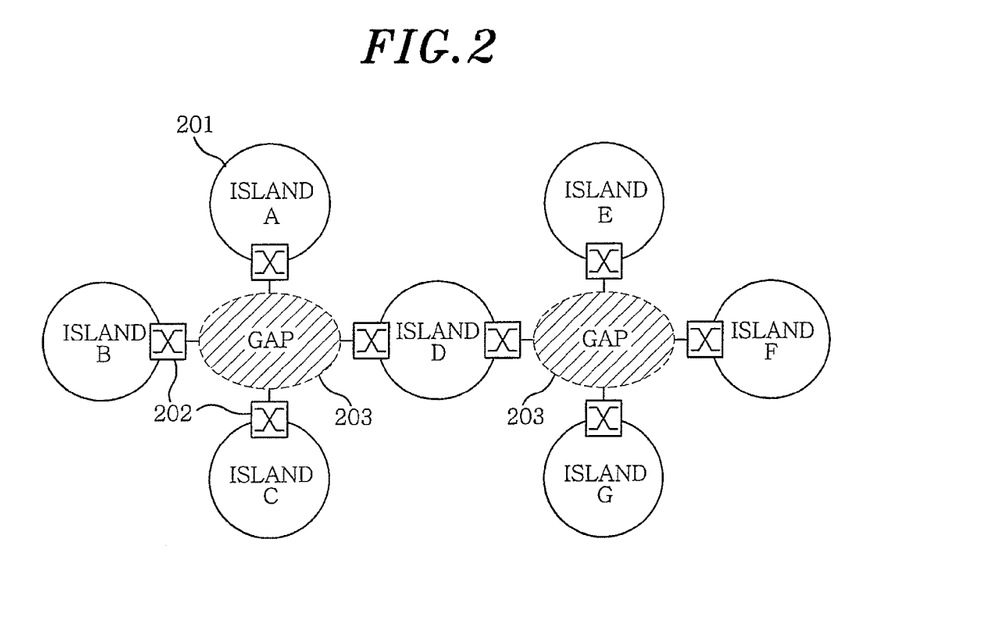
FIG. 2 illustrates an example of a gap that may be generated when a process of discovering an island edge ends during a topology inspection procedure in FIG. 1.

The third process S130 includes a process S131 of inspecting an island consisting of shallow segments connected via a switch, and a process S133 of analyzing a switch that is an edge of each island. When the island edge analysis is terminated in the third process S130, a topology of shallow segments in which hosts exist in an actual topology has been inspected. However, a network topology connected by layer 2 switches or hubs in which there is no host remains as the gap 203, as shown in FIG. 2. In FIG. 2, reference numeral 201 indicates one island including shallow segments, 202 indicates island edge switches serving as inlets of the islands, and 203 indicates gaps consisting of deep segments.

The fourth process S140 includes a gap division process S141 of dividing a gap into atomic gaps that are no longer divided, and a gap interpretation process S143 of analyzing the atomic gap and completing the topology.

In the gap division process S141, the gap is divided into atomic gaps that are no longer divided through the PCT test. In the gap interpretation process S143, a PCT test result when the atomic gap is generated is analyzed to interpret the gap topology.

Figure 3A:
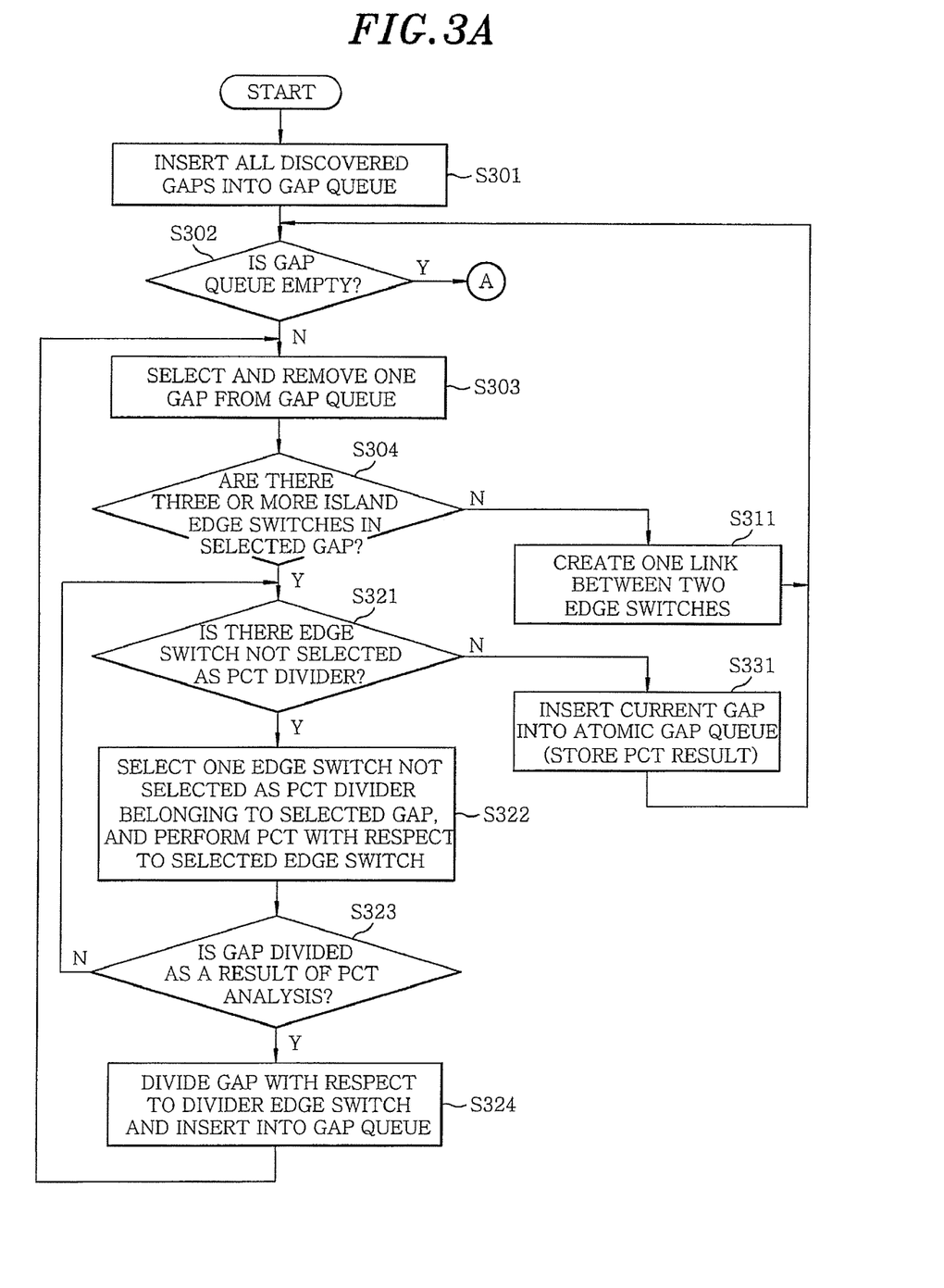
FIGS. 3A and 3B are flow charts illustrating a gap division process and a gap interpretation process according to the present invention.
Figure 3B:
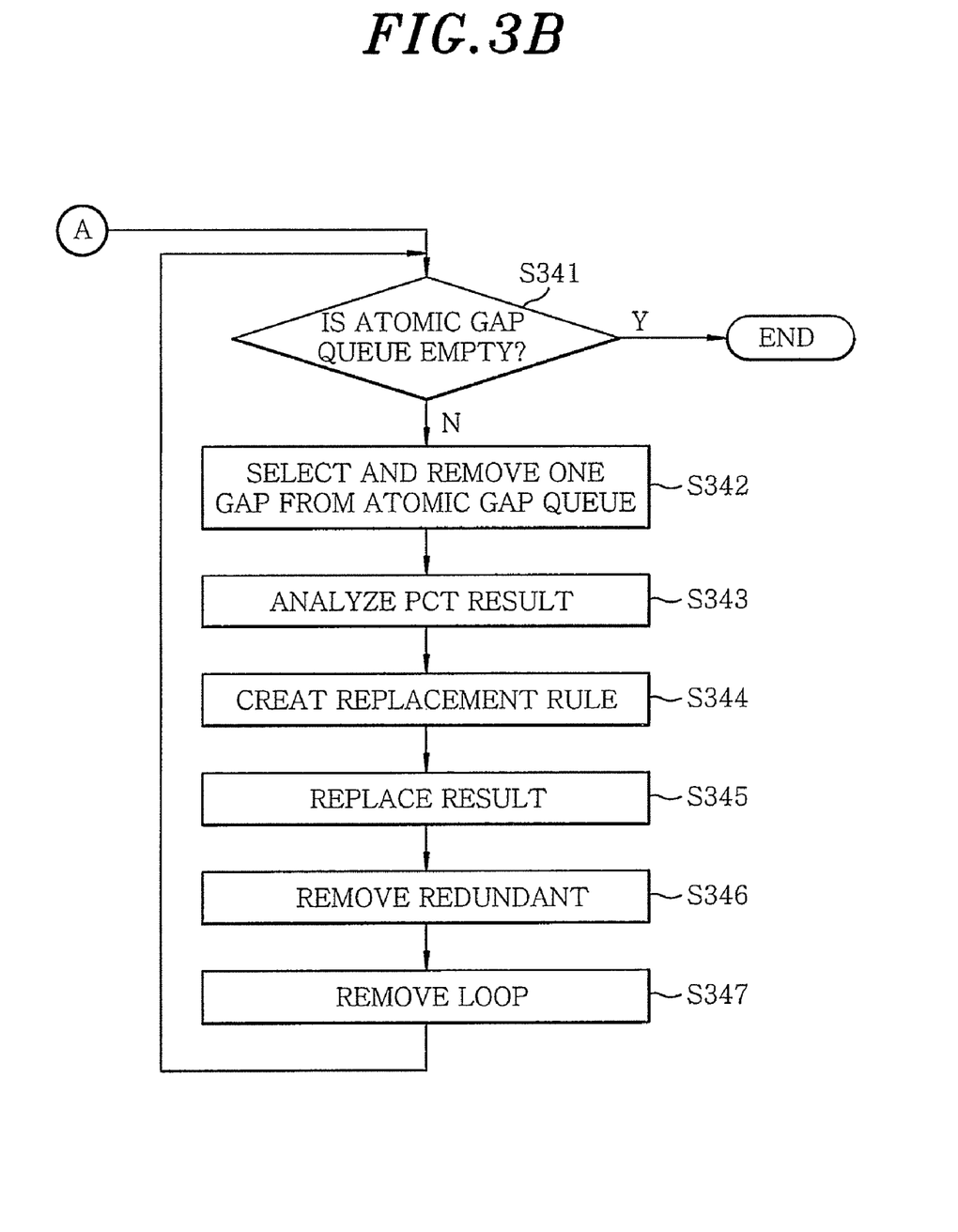

FIGS. 3B and 3b are flow charts illustrating the gap division process and the gap interpretation process according to the present invention.

The gap division process and the gap interpretation process will be described in greater detail with reference to FIGS. 3B and 3b. First, when the island edge discovery process ends in step S130, all discovered gaps are inserted into, i.e., stored in the gap queue (S301).

One of the gaps is then selected and fetched, i.e., removed from the gap queue (S303), and a determination is made as to whether there are three or more island edge switches in the selected gap (S304).

When it is determined in step S304 that there are less than three island edge switches in the selected gap, i.e., that there are two island edge switches in the selected gap, a deep segment between the two island edge switches is regarded as being connected via one Ethernet link (S311).

Meanwhile, when there are three or more island edge switches in the selected gap, a determination is made as to whether there is an edge switch not selected as a PCT divider among the island edge switches belonging to the gap (S321). When there is an island edge switch that is not selected as a PCT divider, the island edge switch not selected as the PCT divider belonging to the selected gap is selected, and PCT is performed with respect to the selected island edge switch (S322). Whether the gap is divided based on the PCT is determined by analyzing PCT result (S323). In this case, when the gap is not divided, whether there is the switch not selected as the PCT divider among the island edge switches is determined. Meanwhile, when the gap is divided after PCT is performed, the gap is divided with respect to the divider edge switch and inserted again into the gap queue again, and the process of fetching gaps from the gap queue is initiated again (S324). Here, the PCT process in step S322 will be described below in greater detail with reference to FIG. 4. The process in step S323 will be described below in detail with reference to FIG. 5.

When it is determined in step S321 that when the gap is not divided even though all the island edge switches become PCT dividers, the PCT-tested gap is regarded as an atomic gap and stored together with the PCT result information in the atomic gap queue (S331).

The gap analysis process (S303 to S331) is performed until the gap queue is empty as a result of checking the gap queue (S302).

Meanwhile, when it is determined in step S302 that the gap queue is empty, a gap interpretation process of analyzing and interpreting the atomic gap stored in the atomic gap queue to define the gap topology is initiated.

First, one of the gaps is selected and fetched from the atomic gap queue, i.e., removed from the atomic gap queue (S342), the PCT result in step S322 is analyzed for gap analysis (S343), a replacement rule is created (S344), the result is replaced (S345), a redundant is removed (S346), and finally a loop is removed from the topology (S347). The gap interpretation process is performed until the atomic gap queue is empty (S341). Here, the PCT result analysis process in step S343 will be described below in greater detail with reference to FIG. 6, and the replacement rule creating process in step S344 will be described below in detail with reference to FIG. 7.

Figure 4:
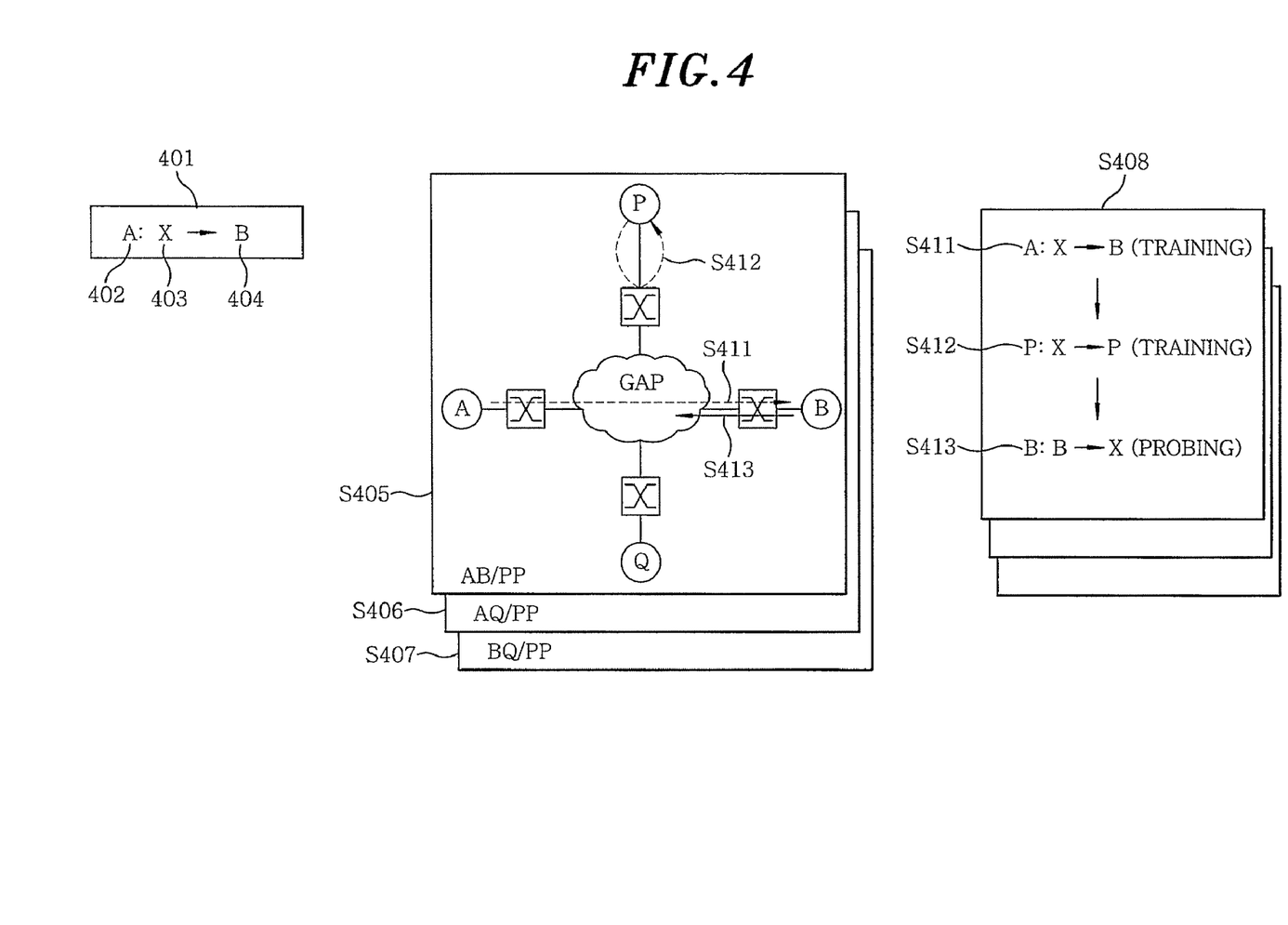
FIG. 4 illustrates a PCT process performed for gap analysis.

FIG. 4 illustrates a PCT process performed for gap analysis.

In FIG. 4, reference numeral 401 indicates a basic PCT notation, 402 indicates a node ID transmitting a packet, 403 indicates an address recorded in a source address field of the transmitted packet, and 404 indicates an address of a destination node to which the packet is directed.

S405 is one step when PCT is performed with respect o an island P in a gap consisting of four islands A, B, P, and Q, inspecting if whether the two islands A and B are divided by an edge switch of the island P. S406 indicates a process of inspecting if two islands A and Q are divided by the edge switch of the island P in the same environment as in S405, S407 indicates a process of inspecting if the two islands B and Q are divided by the edge switch of the island P in the same environment as in S405, and S408 indicates a content of a PCT packet transmitted and received for the process S405 in which S411, S412, and S413 are sequentially performed.

Here, in S411, node A sets a source address to X while delivering a packet to node B, in which the packet is not stored because it is a training packet. In S412, node P sets the source address to X while delivering a packet to node P, in which the packet is not stored because it is a training packet. In S413, node B node delivers a packet to X. This packet is a probing packet and all nodes probing this packet record and store the packet.

Figure 5:
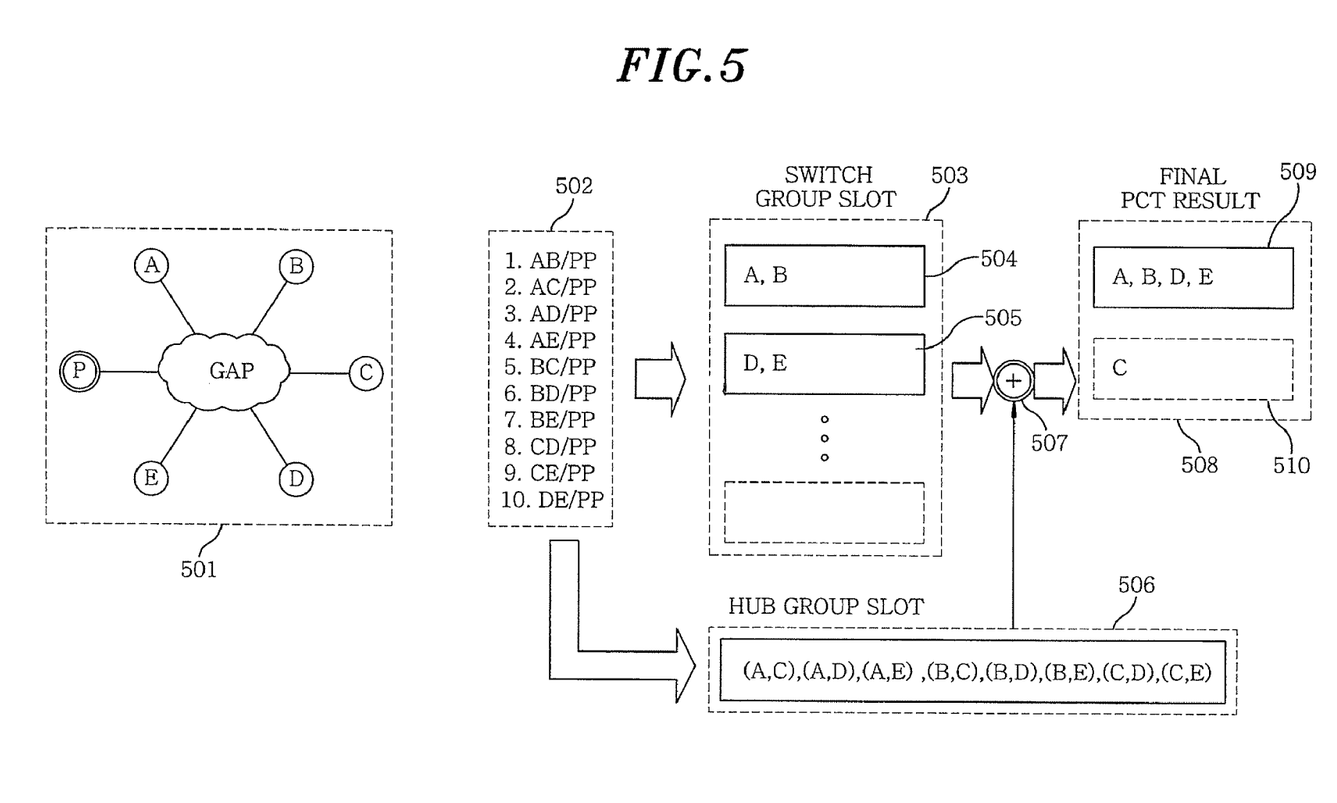
FIG. 5 is a flow chart illustrating a process of determining whether a gap is divided after PCT is performed.

FIG. 5 is a flow chart illustrating a process of determining whether a gap is divided after PCT is performed.

In a process of determining whether a gap is divided with reference to FIG. 5, a definition of a notation and basic rules for interpretation are as follows:

$[X, Y, \ldots]_N$: A list of island IDs in a switch group slot N
$(X,Y)$: An island pair in a hub group slot
$(X,Y)_N$: An island pair in a hub group slot N Rule 1

For any L, M, and N, if $(([X, Y, \ldots]_N \cap [W, Z, \ldots]_M) \neq \phi)$ then $[W, X, Y, Z, \ldots]_L = ([X, Y, \ldots]_N \square [W, Z, \ldots]_M)$ and switch group slots N and M are deleted. According to Rule 1, when there is an island ID belonging to both the switch group slots N and M created by PCT, the two switch group slots are integrated to create a new switch group slot L.

Rule 2

For any X, Y, L, M, and N and M≈N, if $((X\square[\ldots, X, \ldots]_N$ and $(Y\square[\ldots, Y, \ldots]_M))$, then $[\ldots, X, Y, \ldots]_L = ([\ldots, X, \ldots]_N \square [\ldots, Y, \ldots]_M)$ and switch group slots N and M are deleted and a (X,Y) pair is also deleted from the hub group slot. According to rule 2, when an island ID as an element of any island pair in the hub group slot is included in different switch group slots, the two switch group slots are integrated into one.

Rule 3

HUB={X|X=any element of (X, Y) in hub group slot}−{X|X=any element of [X, . . . ] in final switch group slot}. According to rule 3, a final switch group slot is obtained, a union set of island IDs belonging to all island pairs remaining in the hub group slot is obtained to create an island list, and a difference set with the final switch group slot is obtained.

In FIG. 5, reference numeral 501 indicates an example of a gap to be analyzed. Six islands A, B, C, D, E, and P are connected to the gap, in which the island P is a divider. FIG. 5 shows a process of selecting the island P as a divider, performing PCT, and then analyzing PCT when the six islands A, B, C, D, E, and P are connected to one gap (501).

Here, when PCT is performed with the island P selected as a divider, a total of ten different PCTs are necessary. Reference numeral 502 shows items of PCT to be performed when the island P is selected as a divider. In this example, a total of ten PCTs must be performed.

In FIG. 5, reference numeral 503 indicates a switch group slot that stores information on islands divided by the edge switch of the island P by analyzing the PCT result. Reference numeral 506 indicates a hub group slot that stores a list of island pairs divided by the hub as a result of PCT. Thus, the PCT result is divided into a plurality of switch group slots 503 and one hub group slot 506, which are stored.

In FIG. 5, as a first PCT in the PCT item 502 is performed, island IDs A and B are assigned and produced to a first switch group slot 504 in the switch group slot 503. As a tenth PCT is performed, island IDs D and E are assigned and produced to a second switch group slot 505 in the switch group slot 503. As a second to ninth PCTs are performed, eight hub group slot items are produced in the hub group slot 506. Here, when the islands are divided by P in each test, they are assigned to different slots in the switch group slot 506. When the islands are not divided, they assigned to the same slot in the switch group slot 506. When the islands are divided by the hub, they are assigned to as one pair to the hub group slot 506.

Reference numeral 507 indicates a process of collecting information for the switch group slot 503 and the hub group slot 506 and analyzing a final PCT result.

When rule 3 is applied to the switch group slot 503 and the hub group slot 506 in FIG. 5, a final PCT result 508 is that one switch group slot 509 and a hub group slot 510 having an island ID of "C" remain.

When only one switch group slot finally remains after the interpretation rule is applied as a result of the PCT result as described above, it is the case in which the divider does not divide the gap, and when there remain two or more switch group slots, it is the case in which the divider divides the gap. In the former case, the switch group slot 503 and the hub group slot 506 that are the PCT results are stored, and when there is an island ID not yet selected as a PCT divider, the island is selected as the divider and then the PCT is performed again (see S321 in FIG. 3A). In the latter case, an island set belonging to one switch group slot and an island set in the hub group slot are summed and regarded as one gap, each gap is inserted into the gap queue, and then the routine (see S303 in FIG. 3A) is performed.

Meanwhile, the following interpretation rules are applied to analyze the PCT result and formalize the topology:

Rule 4

When the hub of rule 3 is not a null set, the edge switch of the divider island is connected to a hub constituting the gap.

Rule 5

When the hub of rule 3 is a null set, the edge switch of the divider island is connected to a switch constituting the gap.

Rule 6

Figure 6:
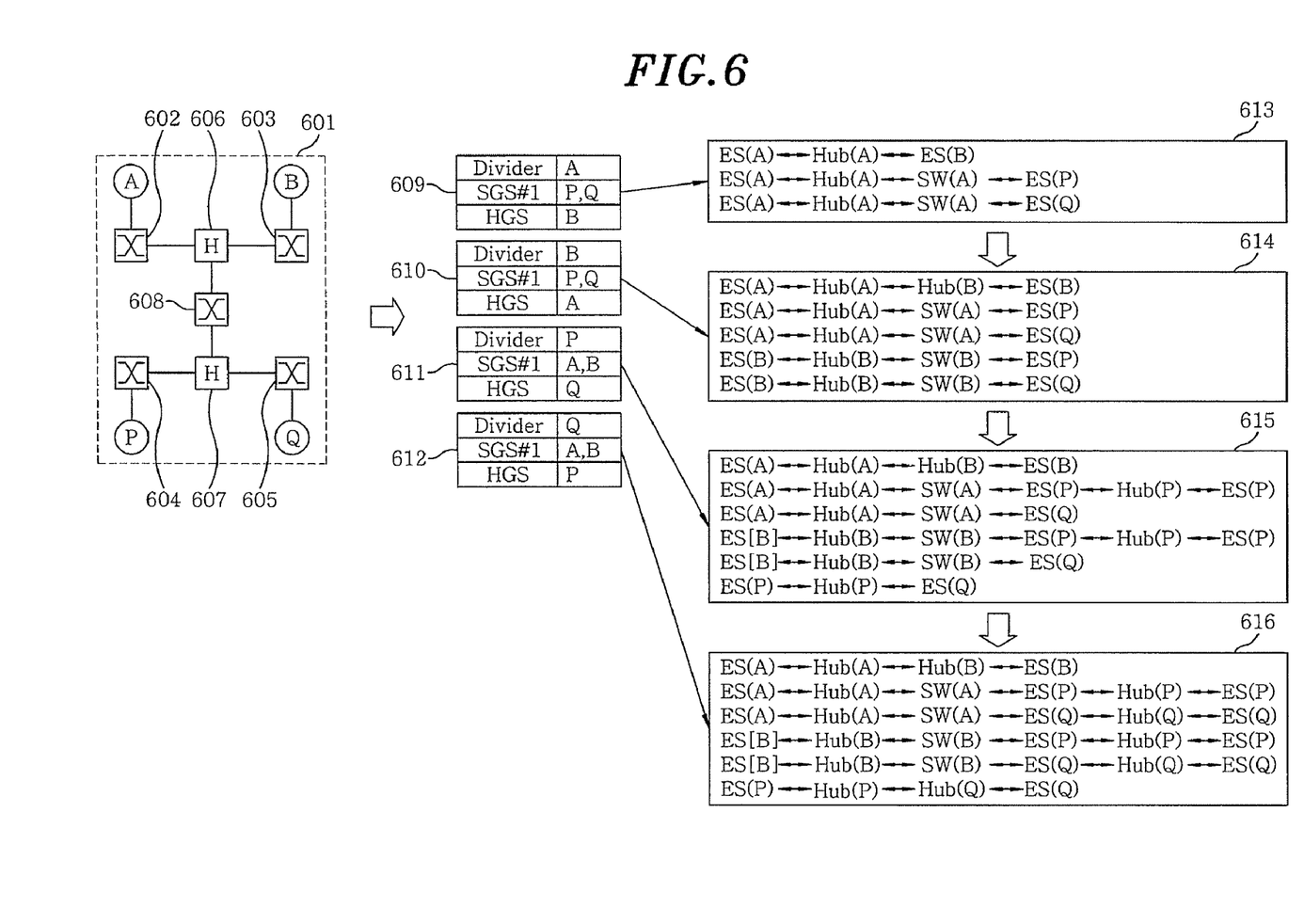
FIG. 6 illustrates a process of analyzing an atomic gap.

There is at least one switch between each island edge switch in the switch group slot and the divider island edge switch FIG. 6 illustrates a process of analyzing an atomic gap.

An actual network 601 is built by four islands A, B, P, and Q, edge switches 602 to 606, and two hubs 606 and 607 and one switch 608 in a gap. While a total of four PCTs are being performed with the four island switches selected as dividers, the gaps are not divided and become atomic gaps. The PCT result leads to switch group slots and hub group slots indicated by reference numerals 609 to 612. In analyzing the result when the edge switch 602 of the island A is selected as a divider, since the islands P and Q are in switch group slot 609, SGS#1 and the island B is in the hub group slot 609, HGS, rules 4 and 6 are applied. In this case, the edge switch 613, ES(A) of the island A must be unconditionally connected to the hub 613, Hub(A) according to rule 4. Further, there is at least one switch 613 SW(A) between the edge switches 604 and 605 of the islands P and Q according to rule 6. This is indicated by reference numeral 613. Similarly, PCT results 610 to 612 are sequentially applied as shown by reference numeral 614 and 615, an expression indicated by reference numeral 616 is obtained.

A replacement rule creating task (see S344 in FIG. 3B) is then performed to interpret the PCT result and simplify content of the expressed topology. The following rules are applied to create a replacement rule.

Rule 7

One of two continuous hubs having different IDs is replaced with the other. That is, when there is an expression "Hub(X)–Hub(Y)", "Hub(Y)" is replaced with "Hub(X)" to create the following rule: "Hub(Y) is replaced with Hub(X)"

Rule 8

One of two continuous switches having different ID is replaced into the other. That is, when there is an expression "SW(X)–SW(Y)", "SW(Y)" is replaced with "SW(X)" to create the following rule: "SW(Y) is replaced with SW(X)."

Rule 9

When there are replacement rules "A is replaced with B" and "B is replaced with C," the following rule is derived: "A is replaced with C."

Rule 10

When there are replacement rules "A is replaced with B" and "A is replaced with C," the following rule is derived: "B is replaced with C."

Figure 7:
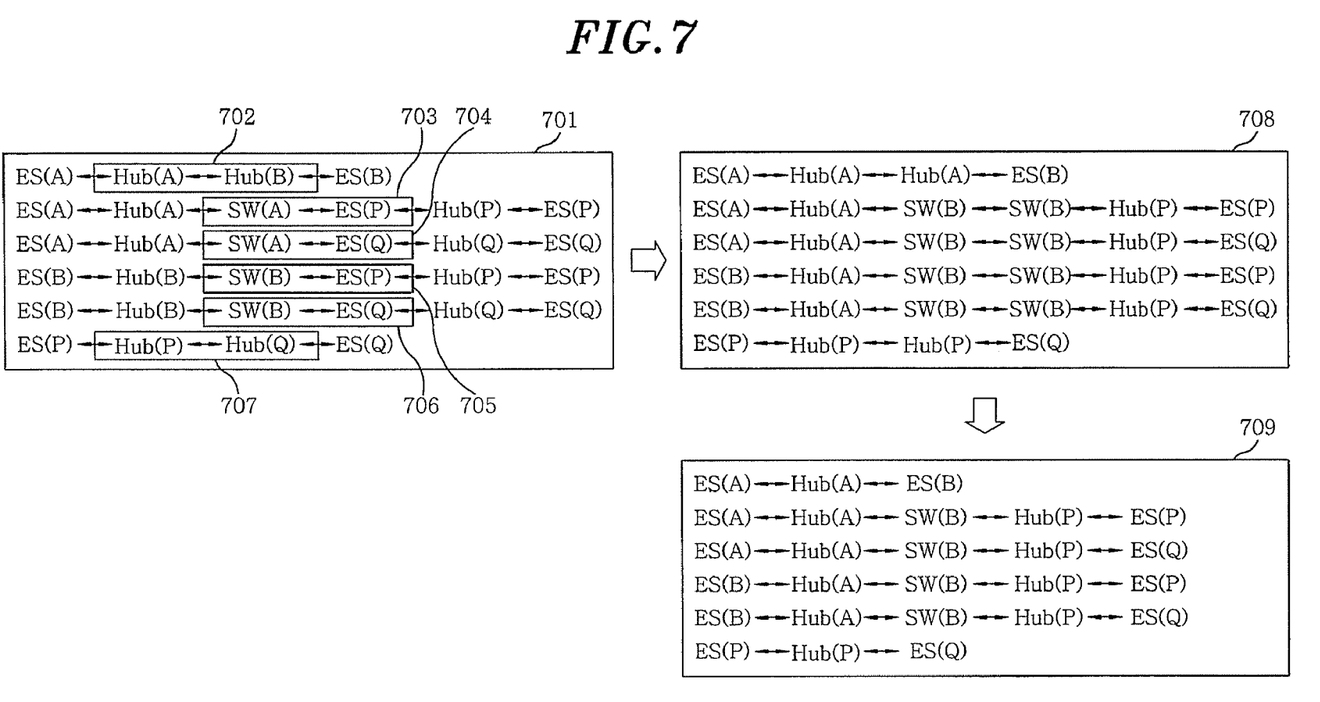
FIG. 7 illustrates a process of creating replacement rules based on a final result obtained by analyzing a PCT result of FIG. 6.

FIG. 7 illustrates a process of creating replacement rules based on a final result 701 obtained by analyzing the PCT result of FIG. 6.

In reference numeral 701, in the cases of reference numerals 702 and 707 in which there are two continuous hubs, rule 7 is applied, and rules "Hub(B) is replaced with Hub(A)" and "Hub(Q) is replaced with Hub(P)" are created. In reference numeral 701, in the case of reference numerals 703 to 706 in which there are two continuous switches, rule 8 is applied and four rules "SW(P) is replaced with SW(A)", "SW(Q) is replaced with SW(A)", "SW(P) is replaced with SW(B)", and "SW(Q) is replaced with SW(B)" are created. In this case, such rules result in a rule "SW(A) is replaced with SW(B)" according to rule 10. By applying such rules, a topology expression as indicated by reference numeral 708 is obtained (see S345 in FIG. 3B).

When the replacement rules have been applied, redundant expressions are removed. In FIG. 7, reference numeral 709 shows a simplified expression when the same device continuously appears as in reference numeral 708 (S346 in FIG. 3b).

After the redundant is removed, whether there is a loop in the topology expression is determined. When there is the loop, a connection of SW(A)–Hub(B)–SW(C)–SW(A) is made. In this case, a connection between switches, i.e., SW(C) and SW(A) is deleted to remove the loop (S347 in FIG. 3B).

The method for gap analysis for topology inspection according to the present invention can be implemented as computer programs. Codes and code segments of the program may be inferred by computer programmers skilled in the art. Further, the computer program is stored in a computer-readable information recording medium, and read and executed by a computer to implement the method for gap analysis for topology inspection. The information recording medium includes a magnetic recording medium, an optical recording medium, and carrier wave medium.

While the invention has been shown and described with respect to the embodiments, it will be understood by those skilled in the art that various changes and modifications may be made without departing from the scope of the invention as defined in the following claims.

What is claimed is:

1. A method for gap analysis for topology inspection to recognize a topology of a deep segment through gap discovery in an Ethernet network, the method comprising:

a gap division process of dividing a gap into atomic gaps that are no longer divided through path crossing test (PCT); and a gap interpretation process of analyzing a final result of the PCT when the atomic gap is generated, to interpret a topology of the gap, wherein the gap division process comprise:

storing the discovered gaps in a gap queue;

fetching the gaps from the gap queue one by one until the gap queue is empty and checking the number of island edge switches;

when the number of the island edge switch is less than a set number, regarding the deep segments between the island edge switches as being connected via one Ethernet link; and when the number of the island edge switches is more than the set number, performing the PCT test on edge switches belonging to the fetched gaps until there is no edge switches that are not selected as a PCT divider, and storing the divided atomic gaps in an atomic gap queue.

2. The method of claim 1, wherein storing the atomic gaps in the atomic gap queue comprises:

determining whether there is an island edge switch that is not selected as a PCT divider among the island edge switches belonging to the gap;

when there is an island edge switch that is not selected as a PCT divider, selecting the island edge switch that is not selected as a divider belonging to the gap and performing the PCT on the selected island edge switch;

analyzing the PCT result to determine whether the gap is divided;

determining again whether there is a switch is not selected as a PCT divider when the gap is not divided, and dividing the gap with respect to the divider edge switch and inserting the divided gaps into the gap queue when the gap is divided; and when there is no island edge switch that is not selected as a PCT divider, regarding a gap subjected to PCT as the atomic gap and storing the gap together with PCT result information in the atomic gap queue.

3. The method of claim 1, wherein the gap interpretation process comprises:

fetching the atomic gaps from the atomic gap queue one by one until the atomic gap queue in which the atomic gaps are stored is empty, and analyzing the PCT result to formalize the topology;

creating replacement rules to replace the PCT result and convert a topology expression; and removing a redundant expression of the topology expression and then removing a loop.

4. The method of claim 1, wherein the PCT test result is divided into a plurality of switch group slots and one hub group slot, which are stored.

5. The method of claim 4, wherein the final result of the PCT is obtained using a rule that when there is an island ID belonging in common to two switch group slots created by the PCT test result, the two switch group slots are incorporated to create a new the switch group slot.

6. The method of claim 4, wherein the final result of the PCT is obtained using a rule that when island IDs as elements of an island pair in the hub group slot are included in different switch group slots, the two switch group slots are incorporated into one.

7. The method of claim 4, wherein the final result of the PCT is obtained using a rule that after a final switch group slot is obtained, a union set of island IDs belonging to all island pairs remaining in the hub group slot is obtained to create an island list and a difference set with the final switch group slot is obtained.

8. The method of claim 7, wherein when a hub of the rule is not a null set, a rule that the edge switch of the divider island is connected to a hub constituting the gap is applied in analyzing the final result of the PCT.

9. The method of claim 7, wherein when a hub of the rule is a null set, a rule that the edge switch of the divider island is connected to a switch constituting the gap is applied in analyzing the final result of the PCT.

10. The method of claim 4, wherein a rule that there is at least one switch between each island edge switch in the switch group slot and a divider island edge switch is applied in analyzing the final result of the PCT.

11. The method of claim 3, wherein the replacement rule is created by applying a rule that one of two continuous hubs having different IDs is replaced with the other.

12. The method of claim 3, wherein the replacement rule is created by applying a rule that one of two continuous switches having different IDs is replaced with the other.

13. The method of claim 3, wherein the replacement rule is created by applying a derived rule "A is replaced with C" when there are replacement rules "A is replaced with B" and "B is replaced with C."

14. The method of claim 3, wherein the replacement rule is created by applying a derived rule "B is replaced with C" when there are replacement rules "A is replaced with B" and "A is replaced with C."

15. A method for gap analysis for topology inspection to recognize a topology of a deep segment through gap discovery in an Ethernet network, the method comprising:

a gap division process of dividing a gap into atomic gaps that are no longer divided through path crossing test (PCT), wherein the divided gap into atomic gaps that are no longer divided through the PCT is based on performing the PCT on edge switches belonging to the gaps until there is no edge switches, and wherein the PCT is only performed when a number of island edge switches is more than a predetermined set number; and a gap interpretation process of analyzing a final result of the PCT when the atomic gap is generated, to interpret a topology of the gap.

* * * * *